United States Patent [19]

Kusano

[11] Patent Number: 5,751,866
[45] Date of Patent: May 12, 1998

[54] IMAGE SCANNING SYSTEM

[75] Inventor: Satoshi Kusano, Saitama-ken, Japan

[73] Assignee: Pioneer Electronic Corporation, Tokyo, Japan

[21] Appl. No.: 608,363

[22] Filed: Feb. 28, 1996

[30] Foreign Application Priority Data

Feb. 28, 1995 [JP] Japan .................. 7-040961

[51] Int. Cl.$^6$ .................................. G06K 9/00
[52] U.S. Cl. .................................. 382/312; 382/276
[58] Field of Search ............................. 382/309, 311, 382/312, 313, 314, 315, 316, 317, 318, 319, 321, 322, 323, 324, 276, 162, 163, 164, 165, 167, 173, 175, 180, 181, 278, 282, 283, 284, 286, 287, 293, 307, 308; 358/538, 461, 406, 429, 453, 452

[56] References Cited

U.S. PATENT DOCUMENTS

| | | | |
|---|---|---|---|
| 4,641,199 | 2/1987 | Miyagi | 358/285 |
| 4,734,782 | 3/1988 | Maeshima | 358/280 |
| 4,937,662 | 6/1990 | Matsunawa et al. | 358/75 |
| 5,129,013 | 7/1992 | Holzmann et al. | 382/309 |
| 5,133,024 | 7/1992 | Froessl | 382/309 |
| 5,140,440 | 8/1992 | Sasaki | 358/453 |
| 5,168,373 | 12/1992 | Nakamura | 358/406 |
| 5,259,041 | 11/1993 | Kato et al. | 382/48 |
| 5,297,222 | 3/1994 | Mori et al. | 382/321 |

*Primary Examiner*—Leo Boudreau
*Assistant Examiner*—Bijan Tadayon
*Attorney, Agent, or Firm*—Nikaido Marmelstein Murray & Oram L L P

[57] ABSTRACT

A line sensor having a plurality of photoelectric conversion elements is provided for producing image data dependent on an optical image of at every scanning line. Marker data of a green line is generated on demand. A changeover switch is provided for selectively switching the image data and the marker data, and a display memory is provided for storing the image data and marker data. A controller produces a first write signal for writing the marker data and a second write signal for writing the image data at every scanning line. A timing signal is generated for deciding timing for producing the first write signal and the second write signal. A monitor is provided for displaying the green line dependent on the stored marker data and an image dependent on the stored image data, superimposing on the green line.

4 Claims, 3 Drawing Sheets

FIG.3
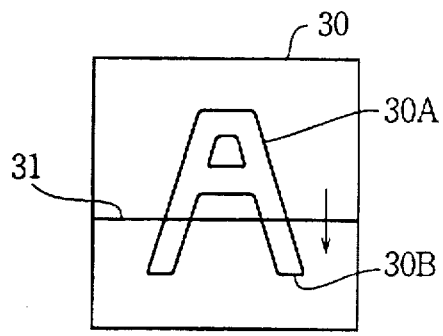
FIG.4
PRIOR ART
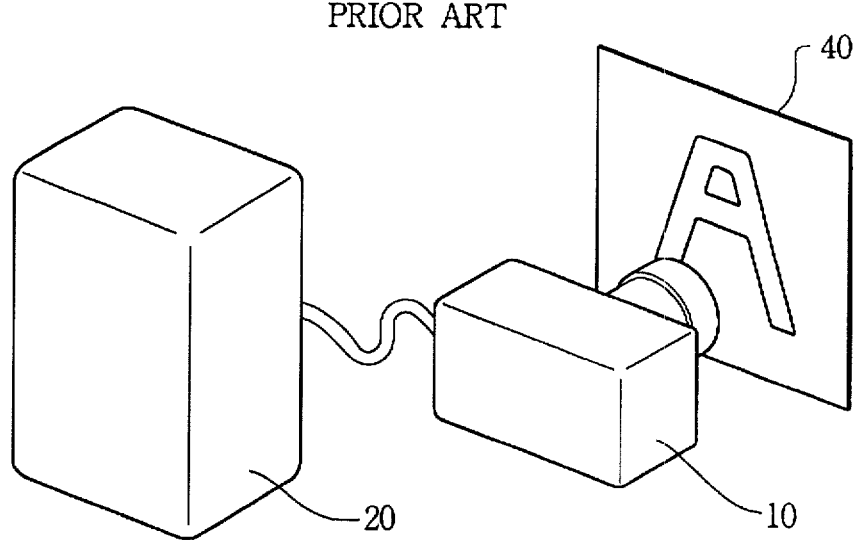
FIG.5 a  FIG.5 b
PRIOR ART
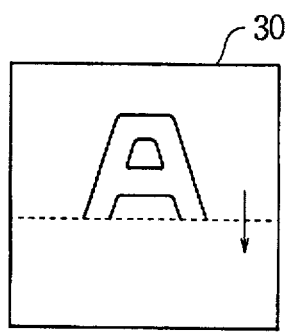
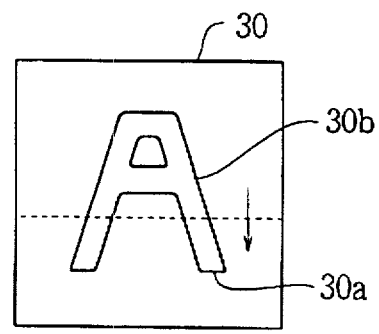

IMAGE SCANNING SYSTEM

BACKGROUND OF THE INVENTION

The present invention relates to an image scanning system which directly converts an optical image of a two-dimensional or a three-dimensional object into an electronic signal, and stores the signal in an electronic data file with a high fidelity, and more particularly to a system wherein the reading conditions of an image on a monitor can be easily adjusted when the image is scanned a number of times.

Referring to FIG. 4, a conventional image scanner 10 has a line sensor (not shown) comprising a plurality of photoelectric conversion elements, and having a size of about 2 by 10 cm. The line sensor scans a picture 40 to obtain an image data of a still image, and stores the data in an electronic filing system provided in an image processor 20

The still image of the picture 40 is often shown on a monitor in real-time while the picture is scanned. The operator may hence see the image to confirm that the picture 40 is correctly picked up by the scanner under desirable conditions. For example, the picture 40 is scanned several times to elaborately adjust the contrast, hue, and the focus. Namely, in a conventional image scanner, a display memory provided in the image processor 20 is cleared each time the picture is scanned. FIG. 5a shows an image on a monitor 30. The present scanning position is indicated by displaying only the scanned image. Namely, the dotted line shows the presently scanning position, thereby enabling to check the present scanning condition.

However, if the memory in the image processor 20 is cleared each time the picture 40 is scanned, it takes a long time to read the picture again and show the image on the monitor. Moreover, the presently shown image cannot be compared with the previous image obtained by the prior scanning. Hence, it is difficult to make the adjustments just by watching the present image without any comparison.

There has been proposed a system where, instead of clearing the old image data, the new data are written over the old data in the memory. Consequently, as shown in FIG. 5b, the old image 30a on the monitor 30 is substituted with the new image 30b as the picture is scanned. Thus the old and the new images can be compared.

However, when the adjustments are so delicate, it is difficult to identify the border between the old and new images, indicated by a dotted line in FIG. 5b, which is the present scanning position. This also makes the adjustments harder.

SUMMARY OF THE INVENTION

An object of the present invention is to provide an image scanning system wherein the old and new images can be simultaneously shown on the monitor when the same picture is scanned several times, thereby to facilitate the adjustments of the scanning conditions.

According to the present invention, there is provided an image scanning system having a line sensor with a plurality of photoelectric conversion elements for producing image data dependent on an optical image of an object at every scanning line, the number of the photoelectric conversion elements being corresponding to a predetermined number of pixels of one scanning line.

The system comprises marker data generator means for generating a marker data of a predetermined color line, a changeover switch for selectively switching the image data applied from the line sensor and the marker data applied from the marker data generator means, display memory means for storing the image data and marker data applied through the changeover switch at predetermined addresses, memory controller means for producing address data representing said predetermined address, and for producing a first write signal for writing the marker data and a second write signal for writing the image data at every scanning line, timing signal generator means for generating a timing signal for deciding timing for producing the first write signal and the second write signal, and for generating a changeover signal for operating the changeover switch in synchronism with the first and second write signals, monitor means for displaying the predetermined color line dependent on the stored marker data and a new image dependent on the stored image data, superimposing on the color line, and substituting an old image with the new image.

The marker data is stored in the display memory means at a leading edge of the first write signal, the changeover signal for storing the image data is generated at a trailing edge of the first write signal, the image data is stored at a leading edge of the second write signal, and the changeover signal for storing the marker data is generated at a trailing edge of the second write signal.

These and other objects and features of the present invention will become more apparent from the following detailed description with reference to the accompanying drawings.

BRIEF DESCRIPTION OF DRAWINGS

FIG. 3 is an illustration showing an image displayed on a monitor in accordance with the present invention;

FIG. 4 is a perspective view of a conventional scanning system; and

FIGS. 5a and 5b are illustrations showing images on a monitor of the conventional scanning system of FIG. 4.

DETAILED DESCRIPTION OF THE PREFERRED EMBODIMENT

Figure 1:
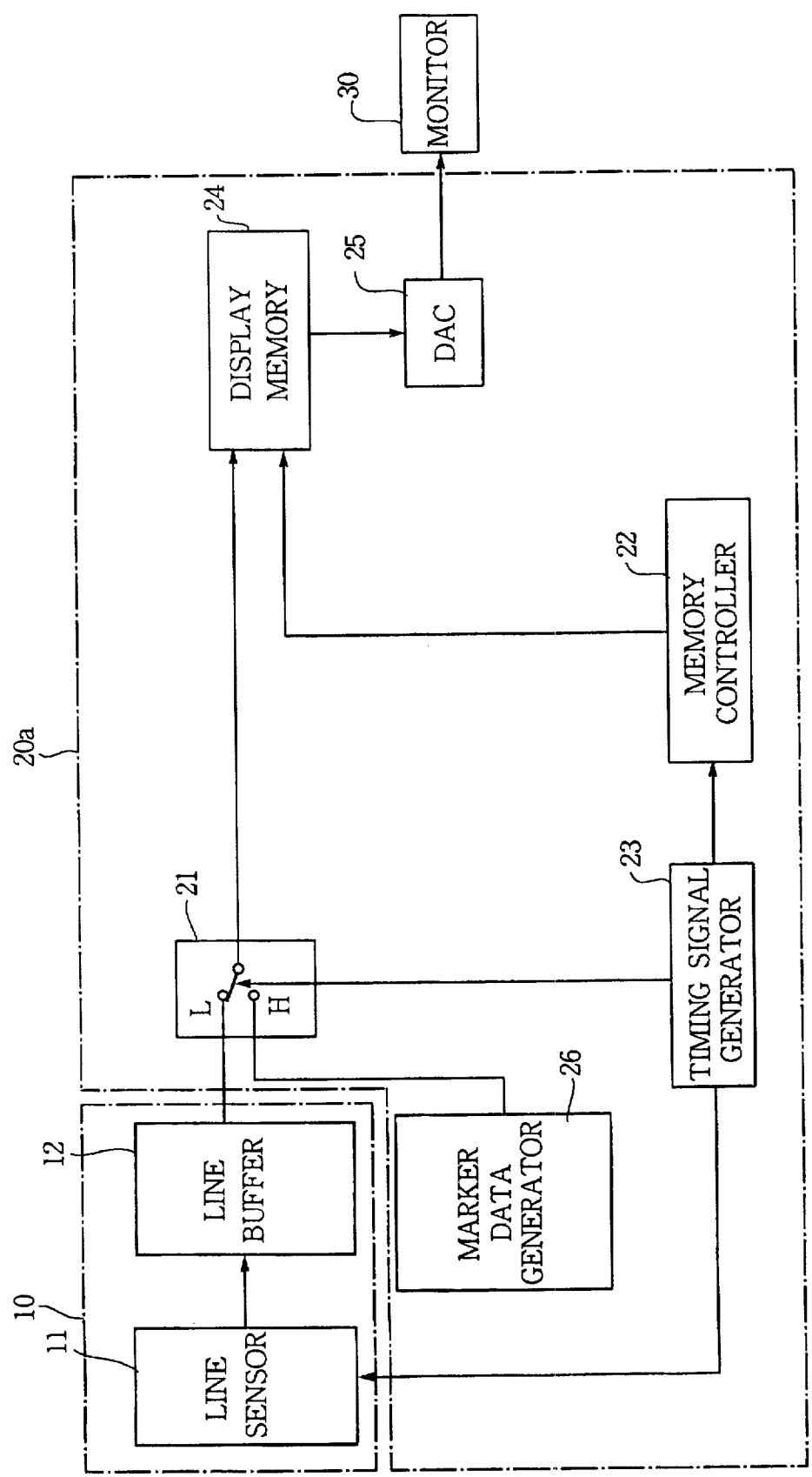
FIG. 1 is a block diagram showing an image scanning system of the present invention.

An image scanning system of the present invention has a construction similar to the conventional system shown in FIG. 4 and the same references as those in FIG. 4 designate the same parts in FIG. 1.

Referring to FIG. 1, the image scanning system comprises the image scanner 10 for picking up data of an optical image, an image processor 20a for processing the image data, and the monitor 30 for showing an image based on image data processed by the image processor 20a.

The image scanner 10 has a line sensor 11 which picks up the optical image of an object at every scanning line, and a line buffer 12 which stores data of the picked up image. The line sensor 11 is provided with a plurality of photoelectric converters corresponding to the number of pixels in one scanning line.

The image processor 20a has a display memory 24 to which is supplied the image data from the line buffer 12 at every scanning line, through a contact L of a changeover switch 21. The changeover switch 21 further has a contact H connected to a marker data generator 26 which produces marker data of a predetermined color such as green for showing a boundary between the old and new data as a marker line 31 (FIG. 3) on the monitor 30 in green. The image data from the image scanner 10 or the marker data from the marker data generator 26 is selectively fed to the display memory 34 depending on the operation of the switch 21.

The changeover switch 21 is controlled by a timing signal applied from a timing signal generator 23. The timing signal is further fed to the line sensor 11 for determining the pickup timing of the optical image, and to a memory controller 22 for determining the timings at which the image data of each line and the marker data are written in and read out from the memory 24.

More particularly, the memory controller 22 applies an address store command signal to write the image data or the maker data in the display memory 24. An address read out command signal is applied to the memory 24 to read out the data stored therein. The writing and reading timings of the data depends on the scanning cycle of an electron beam provided in the monitor 30. In the present embodiment, the scanning cycle corresponds to a non-interlace of a horizontal scanning frequency of 64 kHz.

The read out image data or the marker data is converted into an analog signal at a D/A converter 25 and further fed to the monitor 30, thereby showing the image picked up by the line sensor 11 thereon.

Figure 2:
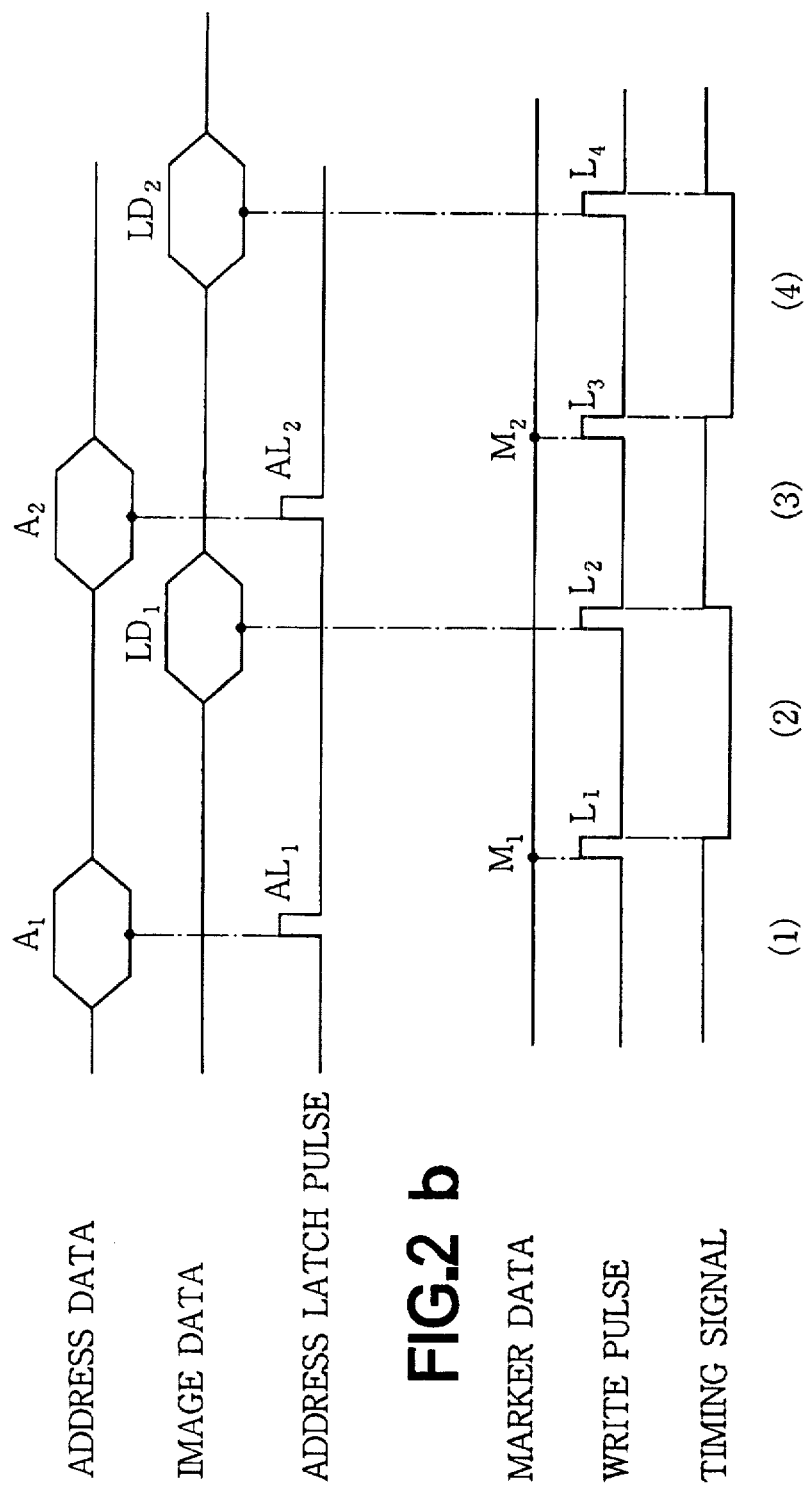
FIGS. 2a and 2b are timecharts describing the operation of the system.

The operation of the present invention is described hereinafter with reference to FIGS. 2a and 2b. FIG. 2a shows the timing for writing the image data in the memory and FIG. 2b shows the timing for writing the marker data.

When the image scanner 10 starts to pickup the optical image, an address latch pulse AL1 is applied from the memory controller 22 to the display memory 24 dependent on the timing signal from the timing signal generator 23 as shown in FIG. 2a. The address latch pulses AL1, AL2 . . . are generated at an interval of, for example, 4 ms. The interval 4 ms corresponds to the total of 2 ms needed as the exposure time of the line sensor 11. The time 2 ms is such a period that the image data of one line are accumulated in the photoelectric converters of the line sensor 11. Time of 2 ms is further needed for transmitting the data.

When the address latch pulse AL1 is applied, an address data A1 of the first line of the image is stored in the display memory 24.

Meanwhile, the contact H of the changeover switch 21 is connected with the display memory 24. When a first write pulse L1 is fed from the memory controller 22 to the display memory 24 as shown in FIG. 2b, at the leading edge thereof, a marker data M1, which corresponds to the color green, is stored in the memory 24 at the latched address A1. The marker data M1 is written over an image data, if any are stored at the address A1 of the first line. The marker data M1 is read out from the display memory 24 in response to the address read out command signal which is fed in accordance with the scanning cycle of the electron beam of the monitor 30. The maker data M1 is converted into an analog signal at the D/A converter 25 and shown on the uppermost scanning line of the display area of the monitor 30, that is to say, a green line is shown.

In synchronism with the trailing edge of the write pulse L1, the timing signal generator 23 feeds the timing signal to change the connecting contact of the changeover switch 21 from the contact H to the contact L. Namely, as shown in FIG. 2b, a high-level timing signal during a period (1) becomes a low-level timing signal in a period (2).

When a second write pulse L2 is applied to the display memory 24, at a timing of the leading edge thereof, a one line image data LD1 stored in the line buffer 12 of the line scanner 10 is applied to the display memory 24 through the contact L of the changeover switch 21 and written at the address A1 of the memory 24 over the marker data M1. The one line image data LD1, like the marker data described above, is read out from the memory 24 in accordance with the address read out command signal, converted into an analog signal at the D/A converter 25, and shown on the first scanning line of the monitor 30 over the green marker.

Meanwhile, at the timing of the trailing edge of the second write pulse L2, the timing signal from the timing signal generator 23 becomes the high-level signal. Hence, during a period (3) in FIG. 2b, the contact H of the changeover switch 21 is connected with the display memory 24. The operation for showing the image data LD1 of the first line on the monitor 30 is thus completed.

After the predetermined interval, a second address latch pulse AL2 is fed to the display memory 24, thereby latching a second address data A2 which corresponds to the second line of the monitor 30. When a third write pulse L3 is fed from the memory controller 22 to the display memory 24, since the marker data generator 26 is already connected to the memory 24, a marker data M2 is stored in the memory 24 at the latched address A2. The marker data M2 is read from the display memory 24 in response to the address read out command signal which is fed in accordance with the scanning cycle of the electron beam of the monitor 30. The maker data M2 is converted into an analog signal at the D/A converter 25 and shown on the second scanning line of the display area of the monitor 30.

On the other hand, in synchronism with the trailing edge of the write pulse L3, the timing signal generator 23 feeds the timing signal to change the connecting contact of the changeover switch 21 from the contact H to the contact L. Namely, as shown in FIG. 2b, the high-level signal during a period (3) becomes the low-level signal in a period (4).

When a fourth write pulse L4 is applied to the display memory 24, at a timing of the leading edge thereof, a one line image data LD2 stored in the line buffer 12 of the line scanner 10 is applied to the display memory 24 through the contact L of the changeover switch 21 and written at the address A2 of the memory 24 over the marker data M2. The image data LD2 is read out from the memory 24 in accordance with the address read out command signal, converted into an analog signal at the D/A converter 25, and shown on the second scanning line of the monitor 30 over the green marker. The above described operation is repeated.

The image data of each scanning line are thus written and read out from the display memory 24 only after the marker data are written and read out. Hence, as shown in FIG. 3, when a new image 30A of the present scanning is displayed over an old image 30B of the previous scanning, the old image is substituted with the new image, and the green marker line 31 is shown along the front edge of the new image. As a result, the border between the new and old images, that is the present scanning position of the line sensor, becomes apparent, allowing the operator to easily discern the images.

The marker data and the image data are each applied to the display memory 24 in synchronism with the write pulse for storing the marker data, and with the write pulse for storing the image data, respectively. Moreover, the address data is rewritten before the image data is stored in the memory 24 and the marker data is stored before storing the image data, so that, the image data is written over the marker data after a predetermined period.

Accordingly, in order to display on the monitor 30 the data stored at the address of the display memory 24, the image data is shown after the marker data, thereby enabling to easily indicate the present scanning position. The fine adjustments such as of contrast and hue and focusing adjustment can be easily performed while comparing both images.

In the presently described embodiment, the marker data are stored at the address corresponding to only on line. However, the marker data may be stored at a plurality of addresses of the display memory 24 at one time. Hence the marker line covers a plurality of lines thereby becoming bolder.

While the invention has been described in conjunction with preferred specific embodiment thereof, it will be understood that this description is intended to illustrate and not limit the scope of t he invention, which is defined by the following claims.

What is claimed is:

1. An image scanning system having a line sensor with a plurality of photoelectric conversion elements for producing image data dependent on an optical image of an object at every scanning line, the number of the photoelectric conversion elements being corresponding to a predetermined number of pixels of one scanning line, the system comprising:

marker data generator means for generating a marker data of a predetermined color for an entire straight line;

a changeover switch for selectively switching the image data applied from the line sensor for an entire straight line and the marker data applied from the marker data generator means for the entire straight line;

display memory means for storing the image data and marker data applied through the changeover switch at predetermined addresses;

memory controller means for producing address data representing said predetermined address, and for producing a first write signal for writing the marker data and a second write signal for writing the image data at every scanning line for the entire straight line;

timing signal generator means for generating a timing signal for deciding timing for producing the first write signal and the second write signal, and for generating a changeover signal for operating the changeover switch in synchronism with the first and second write signals.

monitor means for displaying the predetermined color line for the entire straight line dependent on the stored marker data and a new image for the entire straight line dependent on the stored image data, wherein the predetermined color line and new image data are displayed such that an old image is superposed with the new image and the predetermined color line is disposed therebetween.

2. The scanning system according to claim 1 wherein the second write signal is generated after the first write signal.

3. The scanning system according to claim 2 wherein the marker data is stored in the display memory means at a leading edge of the first write signal, the changeover signal for storing the image data is generated at a trailing edge of the first write signal, the image data is stored at a leading edge of the second write signal, and the changeover signal for storing the marker data is generated at a trailing edge of the second write signal.

4. The scanning system according to claim 1, wherein said marker data indicates a border between the old image and the new image.

* * * * *